US008848347B2

(12) United States Patent
Doorn et al.

(10) Patent No.: US 8,848,347 B2
(45) Date of Patent: Sep. 30, 2014

(54) ASSEMBLY COMPRISING AT LEAST ONE DUCT AND AT LEAST ONE DISTRIBUTION BOX, AND A METHOD OF MOUNTING A DISTRIBUTION BOX TO A DUCT

(75) Inventors: Mijndert Doorn, Waddinxveen (NL); Jianming Zeng, Eindhoven (NL); Kees Van Trigt, Spijkenisse (NL)

(73) Assignee: Draka Comteq B.V., Amsterdam (NL)

( * ) Notice: Subject to any disclaimer, the term of this patent is extended or adjusted under 35 U.S.C. 154(b) by 462 days.

(21) Appl. No.: 13/104,206

(22) Filed: May 10, 2011

(65) Prior Publication Data

US 2012/0012205 A1    Jan. 19, 2012

(30) Foreign Application Priority Data

May 10, 2010  (NL) ...................................... 2004694

(51) Int. Cl.
*H05K 7/20* (2006.01)
*G02B 6/44* (2006.01)

(52) U.S. Cl.
CPC ............ *G02B 6/4475* (2013.01); *G02B 6/4444* (2013.01); *G02B 6/4447* (2013.01)
USPC ...... 361/677; 361/675; 361/679.46; 361/689; 174/15.1; 174/16.2; 174/72 R; 174/92

(58) Field of Classification Search
USPC .................. 361/675–678, 679.46–679.54, 361/688–722, 831
See application file for complete search history.

(56) References Cited

U.S. PATENT DOCUMENTS

| 5,397,859 | A | * | 3/1995 | Robertson et al. | 174/92 |
|---|---|---|---|---|---|
| 5,804,767 | A | * | 9/1998 | Winfield et al. | 174/74 R |
| 6,265,665 | B1 | * | 7/2001 | Zahnen | 174/92 |
| 6,881,901 | B2 | * | 4/2005 | Egan | 174/665 |
| 7,214,735 | B2 | * | 5/2007 | Jego Stora | 524/588 |
| 7,744,287 | B2 | * | 6/2010 | Lu et al. | 385/56 |
| 8,063,306 | B2 | * | 11/2011 | Zhong et al. | 174/92 |
| 2008/0056661 | A1 | * | 3/2008 | Mullaney et al. | 385/135 |
| 2008/0181570 | A1 | * | 7/2008 | Mullaney | 385/135 |

FOREIGN PATENT DOCUMENTS

| EP | 2 045 504 A1 | 4/2009 |
|---|---|---|
| EP | 2108987 A1 | 10/2009 |
| WO | 96/19024 A1 | 6/1996 |
| WO | 2005/101079 A1 | 10/2005 |
| WO | 2009/029258 A1 | 3/2009 |

* cited by examiner

*Primary Examiner* — Courtney Smith
(74) *Attorney, Agent, or Firm* — Novak Druce Connolly Bove + Quigg LLP

(57) ABSTRACT

An assembly may include at least one duct and at least one distribution box, wherein the distribution box is mounted on the duct in fluid-tight engagement therewith for enclosing a distribution chamber therewith. Also, a method of mounting a distribution box to a duct, at a distribution point that is spaced-apart from duct ends, may include positioning a distribution point duct section in the distribution box, and hermetically sealing a distribution chamber, defined within the distribution box, from an environment of the distribution box.

16 Claims, 5 Drawing Sheets

ASSEMBLY COMPRISING AT LEAST ONE DUCT AND AT LEAST ONE DISTRIBUTION BOX, AND A METHOD OF MOUNTING A DISTRIBUTION BOX TO A DUCT

CROSS-REFERENCE TO RELATED APPLICATION

This application claims the benefit of priority of the Netherlands Patent Application No. 2004694, filed May 10, 2010, pursuant to 35 U.S.C. 119(a)-(d), the disclosure of which is incorporated herein by reference in its entirety as if fully set forth herein.

TECHNICAL FIELD

The invention relates to an assembly comprising at least one duct and at least one distribution box.

BACKGROUND

Applicant's EP2108987A1 discloses an optical box comprising a first part suitable for fastening to an optical fibre distribution cable, and a second part having an opening intended for the passage of at least one optical fibre dropped from the distribution cable and comprising at least one optical component for connecting the dropped optical fibre to at least one optical fibre of a subscriber cable. The second part of the optical box is fastened detachably to the first part of the optical box. The known optical box (also called a "distribution box") makes it possible to combine the dropping and splicing of optical fibres, which is discreet and compact whilst allowing easy and efficient handling by the installation operator.

High-capacity telecommunication cables are used in optical fibre telecommunication systems all the way to the user, known under the English acronym FTTH for "Fiber To The Home" or FTTC for "Fiber To The Curb", and an Individual access to each micromodule and/or each fibre is realized for a distribution into a particular building or a particular floor. In this context, by "distribution cable" is meant a telecommunication cable containing a plurality of fibres which are grouped in micromodules supplying an optical signal to a whole building or a group of buildings. The distribution cable can in particular be a vertical cable installed in the service shaft of a building or an external cable installed in urban conduits. The distribution cable can contain several tens of optical fibres. A known distribution cable is a duct, for example having one or more channels that are enclosed by a duct wall, one or more of the channels including one or more fibres.

By "subscriber cable" is meant a cable containing one or more optical fibres connected to a subscriber box. A subscriber cable generally contains less than 10 optical fibres. A distribution box can supply a whole building, a whole floor or a particular apartment. The distribution cable is generally installed in a service shaft and the subscriber box is installed in each subscriber's premises, at some distance from the distribution cable. In order to connect the fibres of a subscriber cable to the fibres of the distribution cable, typically, a drop cable is used, from the distribution cable to a splicing box in which the bare fibres of the drop cable and of the subscriber cable are connected.

A problem of a prior art assembly is a risk of transport of gasses (for example dangerous, toxic and/or flammable gasses, and/or smoke in case of a fire) from one floor in a multi dwelling unit other floors in the building. Besides, a known distribution box is designed to be installed on one type of riser cable (having one predetermined cable diameter). Thus, different distribution boxes are required for application on different types of cables. Also, an existing distribution box requires different points of fixation to the riser cable, or it must be mounted to a wall. Therefore, installation of a known distribution box can be cumbersome.

The present invention aims to solve or at least alleviate the above-mentioned problems. One aim of the invention is to reduce the risk of spreading of gasses, and/or to reduce spreading of a fire. Also, it may be desirable to provide an efficient way of installing a distribution box, utilizing relatively little installation time.

SUMMARY OF INVENTION

Advantageously, the assembly comprises at least one duct and at least one distribution box, the distribution box being mounted on the duct, in fluid-tight engagement there-with, for enclosing a distribution chamber therewith, particularly such that the distribution chamber is hermetically sealed from an environment of the distribution box.

Thus, risk of spreading of certain gasses, for example between different levels of a building, can be significantly reduced. Thus, in case of a fire, undesired spreading of hot gasses and smoke between different levels of a building via a part of a fibre optic network that contains the (usually hollow) duct and the distribution box can be prevented very well.

Preferably, the distribution box has two duct passages for feeding the duct (without interruptions) through the box.

Also, in a preferred embodiment the assembly includes a least one hollow microduct that is coupled to the distribution box for receiving at least one signal conductor from the distribution chamber. For example, said signal conductor can be a signal conductor that extends via a main duct into the distribution chamber, with or without local splicing. A blocking structure can be provided for blocking passage of a proximal microduct edge, for example for locally positioning a proximal end of the microduct. The blocking structure is preferably provided with a through-hole for passing a signal conductor from the distribution chamber to a microduct (that engages the blocking structure). Also, preferably, the blocking structure can be configured as a sealing means.

According to a preferred embodiment the assembly comprises a resilient sealing material, the resilient sealing material sealing the distribution chamber from an environment of the distribution box.

For example, the sealing material can be compressed by the distribution box and the duct, to seal the distribution chamber from its (local) environment.

Thus, a reliable seal can be achieved. Also, the sealing material can be used to accommodate ducts having different external duct diameters, so that the same distribution box can be mounted on different types of ducts.

The present invention also provides the distribution box as such, leading to the above-mentioned advantages.

Advantageously, the method of mounting a distribution box to a duct, at a distribution point that is spaced-apart from duct ends, comprises:

positioning a distribution point duct section in the distribution box; and hermetically sealing a distribution chamber, defined within the distribution box, from an environment of the distribution box.

With the method according to the invention, the above-mentioned advantages can be achieved.

Further advantageous embodiments of the invention are described in the dependent claims.

BRIEF DESCRIPTION OF THE DRAWINGS

The invention will now be described in more detail on the basis of exemplary embodiments shown in the accompanying drawing. Therein shows.

Equal or corresponding features are denoted by equal or corresponding reference signs in this application.

DETAILED DESCRIPTION

Figure 1:
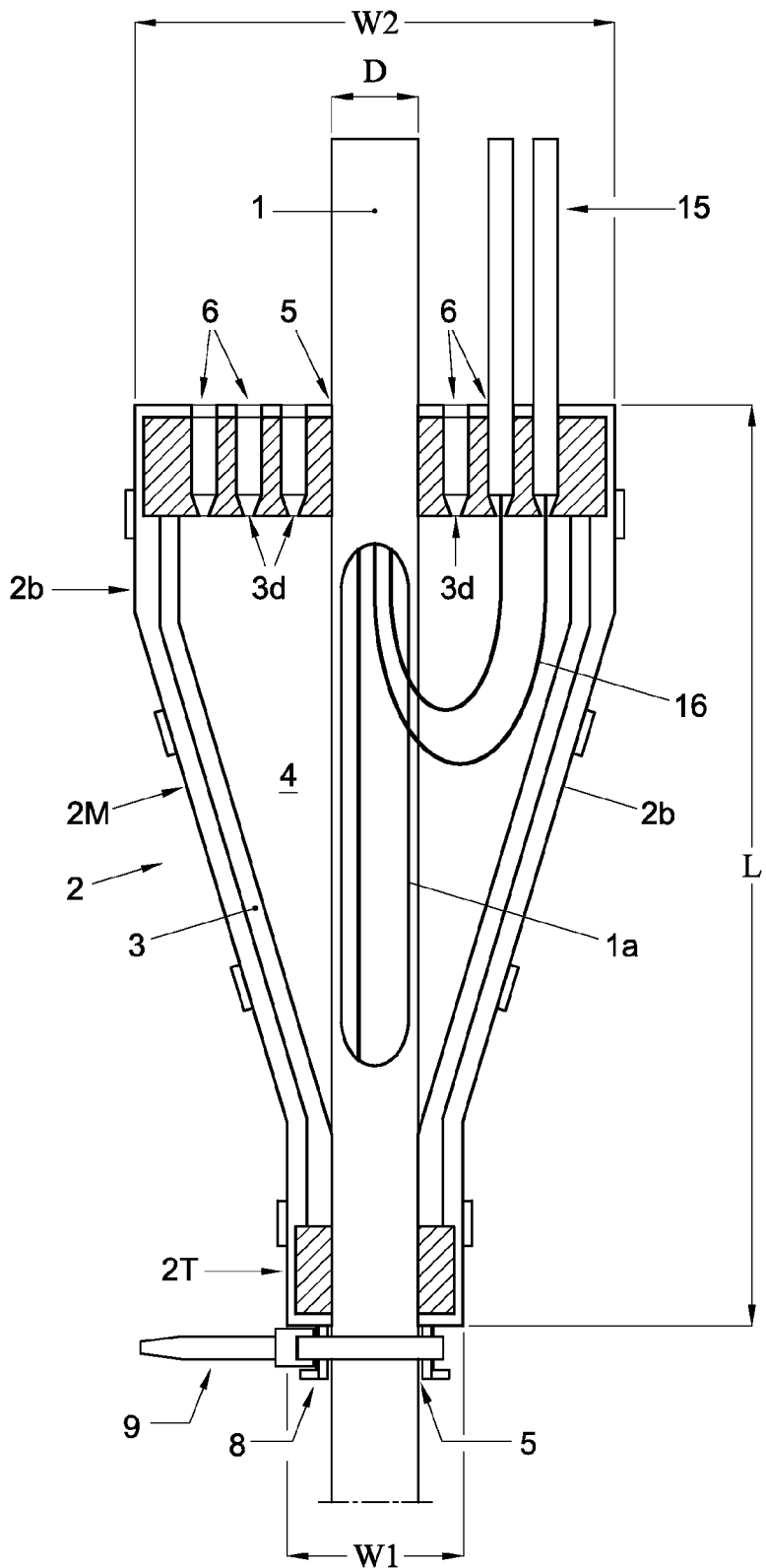
FIG. 1 a front view of part of a non-limiting embodiment of an assembly according to the invention.

FIG. 1 depicts an assembly comprising a primary duct 1 and a distribution box 2 (shown in part), the distribution box 2 being mounted on the duct 1.

The primary duct 1 is a distribution duct (for example a "drop cable" or "riser cable"). After actual mounting, the duct 1 may extend between various floors of a building. The duct 1 can include one or more channels (in this case one) that are enclosed by a duct wall, one or more of the channels including one or more (elongated) signal conductors 16. The duct wall of the duct 1 has been provided with an opening 1a (a "tapping window", for example a longitudinal slit, locally cut out of the duct 1) for providing access to the duct's interior, the opening being located in the distribution box 2 after assembly. As follows from the drawing, the opening 1a does not interrupt the duct 1 (i.e., part of the duct wall bridges the opening 1a). Optionally, the external surface of each signal conductor 16 is not attached to the internal surface of the primary duct 1, such, that at least part of the signal conductor 16 can be moved in longitudinal directions through the duct 1 (for example during installation). In a further embodiment, the at least one signal conductor 16 and duct 1 are installed simultaneously, for example vertically, in a building. In another embodiment, during installation, the signal conductor 16 are (simply) dropped into a mounted duct 1, particularly in a vertical or substantially vertical duct 1, or in a vertical or substantially vertical section thereof.

In yet a further, preferred, embodiment, during installation the duct 1 is provided with another opening (not shown), spaced apart from the tapping window 1a, for gaining access to the at least one signal conductor 16 that extends through the duct 1, particularly for locally cutting that signal conductor 16. For example the further duct opening can be provided substantially at another floor level of a building with respect to a floor level location of a tapping window 1a. Then, after cutting, part of the cut signal conductor 16 can be retracted from the duct 1 via the tapping window 1a, towards and into a respective secondary duct 15 (see FIG. 1).

Preferably, in case of application of a plurality of signal conductors 16, the signal conductors are provided with external markings or indicators (for example by color coding) so that they can be (visually) differentiated from each other.

FIG. 1 also shows application of secondary ducts 15, for example tubes, called "microducts", for guiding signal conductors 16 from the duct 1 to remote locations (for example end-user locations). Generally, in case of application of ducts 1, 15 having walls with circular cross-sections, an external diameter of each microduct 15 is smaller than a diameter D of the primary duct 1, for example at least twice as small. Typically, an external diameter of a microduct can be about 5 mm, or smaller. An external diameter D of a primary duct 1 can be larger than 5 mm, for example in the range of 7-15 mm, or larger than 15 mm.

Preferably, each microduct 15 is configured to (axially) movably receive at least part of a respective signal conductor 16 (for example a conductor 16 that is guided through the primary duct 1 during installation). To this aim, each microduct 15 encloses an internal receiving space, having a diameter that is larger than an external diameter of the respective optical signal conductor 16.

In the present example, signal conductors 16 are shown that are guided between the primary duct 1 and the microducts 15 without intermediate splicing (i.e. in a locally unbroken condition). Thus, relatively little installation space and relatively little installation time is required. In another embodiment, an optical component (for example a local mechanical splice, a fusion splice, an optical splitter) can be installed to connect a signal conductor emanating—via the opening 1a—from the primary duct 1 to a signal conductor that extending into a microduct 15.

Each of the signal conductors 16 as such can be configured in various ways. Each signal conductor 16 can be or include an optical fiber, or a plurality of optical fibers, or a cable comprising one or more optical fibers (providing one or more respective optical waveguides, for transmitting optical signals), for example enclosed within a buffer tube. For instance, said optical fiber may be deployed in either a single fiber loose buffer tube or a multi-fiber loose buffer tube. In other embodiments, the buffer tube may tightly surround an outermost optical fiber coating (i.e., tight buffered fiber) or otherwise surround an outermost optical fiber coating or ink layer to provide an exemplary radial clearance of between about 50 and 100 microns (i.e., a semi-tight buffered fiber). With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less than about 1,000 microns (e.g., either about 500 microns or about 900 microns). With respect to the latter semi-tight buffered fiber, a lubricant may be included between the optical fiber and the buffer tube (e.g., to provide a gliding layer).

An exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

Generally, each of the fibers includes a fiber core and a respective cladding of glass, and one or more optional coatings. Optionally, the optical fiber may include an outermost ink layer. Also, a signal conductor 16 can include a single fibre, for example having a respective external protective fibre coating.

Preferably, "bend-insensitive" fibers (such as ITU-T G657 fibers) are applied, which may buckle (for example due to thermal fluctuations) or bend over a small radius with relatively little or no optical attenuation.

Each of the microducts 15 can be a hollow tube or duct, for example made of plastic (for example High Density Polyethylene, HDPE), configured for loosely receiving signal conductor 16. Preferably, the external surface of the signal conductor 16 is not attached to the internal surface of the microduct 15, such, that the signal conductor 16 can be moved in longitudinal directions through the microduct. In the present example, the external microduct 15 may have a circular cross-section; the microduct's cross-section can also have a different shape, for example oval, rectangular, hexagonal, or differently.

Each microduct 15 is preferably flexible or bendable, allowing ease of installation. Also, the microduct is preferably constructed such that its bending radius is limited. Preferably, a radial and longitudinal freedom of the signal conductor 16 with respect to the microduct 15 is available, to make the signal conductor 16 relatively resistant to rough installation practices.

Referring to the configuration of the distribution box 2, particularly, the distribution box 2 is mounted on the primary duct 1, in fluid-tight (particularly gas-tight) engagement there-with, distribution box 2 being configured for enclosing a distribution chamber 4 with the primary duct 1. The distribution chamber 4 provides space for guiding (and bending) signal conductors 16 between the local duct opening 1a and the secondary ducts 15, for example using a local S-shaped bending of these conductors 16, as in FIG. 1.

In the present example, the distribution chamber 4 is hollow (for example being filled with a gas or gas mixture, for example air). The volume of the distribution chamber 4 can remain relatively small in the case that it does not have to contain above-mentioned optical components (such as splices) for locally connecting conductor parts.

The present distribution box 2 comprises two box parts, for example shells 2a, 2b, that engage the duct 1 (from two sides) after assembly. In this example, the engagement is provided via intermediate sealing means 3 (being shown in cross-section). These sealing means 3 provide a gas tight sealing of the box 2 onto the duct 1, as well as a gas tight closure for the box as such.

Figure 2:
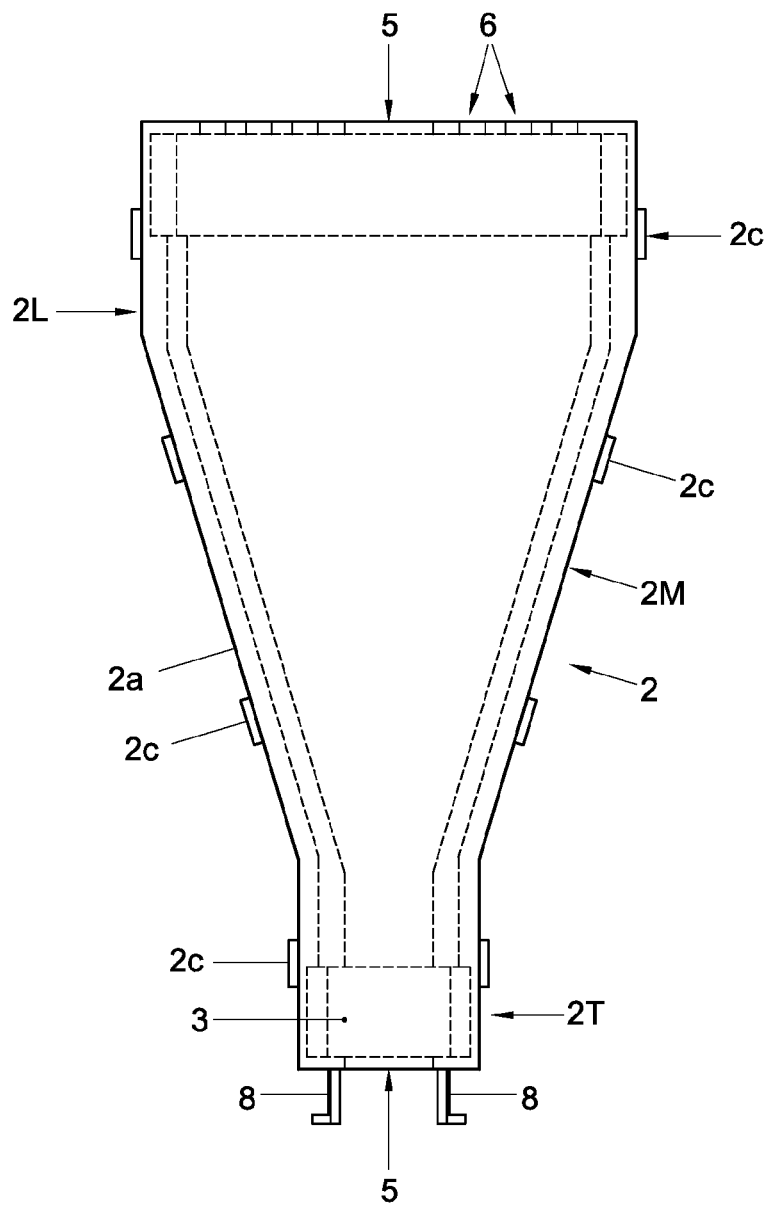
FIG. 2 a front view of the distribution box of the embodiment shown in FIG. 1.

In FIG. 1, the distribution box 2 is depicted with a front part 2a being removed, the front part 2a being shown in FIG. 2. Also, FIG. 1 shows the sealing means in longitudinal cross-section.

The box parts 2a, 2b as such can be made of various materials, plastic or reinforced plastic being a preferred material. As follows from the drawing, particularly, each box part 2a, 2b is provided with a main wall 2k, and side walls 2s protruding from an edge of the main wall 2k, the side walls 2s of the opposite box parts 2a, 2b extending towards each other after mounting.

Figure 3:
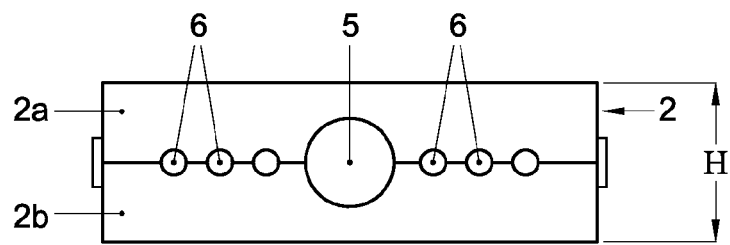
FIG. 3 a bottom view of the distribution box shown in FIG. 2, in an assembled condition.

The distribution box 2 has two primary duct passages 5 (see FIG. 1), located in opposite sides of the box, so that a section of the primary duct 1 can pass through the box 2 (i.e. into and out of the chamber 4). In the present example, the duct passages 5 are located in line with each other, in particular coaxially with a centre line of the box 2, so that the duct 1 can be fed centrally through the chamber 4 in straight line (as in FIG. 1). Also, in this example, each primary duct passage 5 (in this case having a circular cross-section) is defined by two opposite apertures (in this case semi-circular apertures) in respective side walls of the two distribution box parts 2a, 2b. Particularly, the centre points of the primary duct passages 5 are both located in a virtual longitudinal plane that intersects opposite edges of the shells 2a, 2b when they are in an assembled, closed, condition (see FIG. 3).

The distribution box 2 may have various configurations and shapes. For example, the when viewed in a front view, the distribution box 2 may have a polygonal, rectangular, rounded, oval, circular, or a combination of such shapes, or differently shaped external form (outline). As follows from the drawing, in the present embodiment, the distribution box has a first section 2T and an opposite second section 2L. The present first distribution box section 2T is a relatively narrow neck portion (having a first width W1) that includes a first primary duct passage 5. The second distribution box section 2L is a relatively wide portion (i.e. having a second width W2 that is larger than the width W1 of the first box section 2T, for example at least twice as large), and (centrally) includes a second primary duct passage 5, as well as a number of ports for receiving said microducts 15. An intermediate box section 2M extending between the first and second box section 2T, 2L has a tapered shape (when viewed in front view), in this embodiment.

The ports are provided by microduct receiving passages 6, configured for passing proximal end sections of distribution lines (i.e. the microducts 15) there-through, towards the chamber 4. The distribution box 1 can be provided with various numbers of such passages, for example any of the integer range {1, 2, 3, 4, . . . , 10} or another number. In the example, the passages 6 are located on opposite lateral sides with respect to the primary duct passage 5 (see FIG. 3).

Preferably, as in the present embodiment, the microduct receiving passages 6 are symmetrically arranged with respect to a (central) primary duct passage 5. Preferably, an even number of such receiving passages 6 is provided. Also, preferably, only one side of the distribution box 2 (in this case a top side, which is faced upwardly after mounting) is provided with the microduct receiving passages 6, particularly in addition to a respective primary duct passage 5 (wherein an opposite, lower, side is only provided with a primary duct passage 5).

In the present example, the each microduct receiving passages 6 extend in parallel with each other, and also in parallel with the primary duct passages 5. Alternatively, microduct receiving passages can extend in mutually different directions. In another, preferred, embodiment, for example, microduct receiving passages 6 are all arranged such that they are directed towards the duct opening 1a after assembly (i.e. towards a central area of the chamber 5), so that bending of the signal conductors 16 can be reduced. Also alternatively, the primary duct passages 5 may extend in a different direction than microduct receiving passages.

Similar to the primary duct passage 5, in this example, each microduct receiving passage 6 (in this case having a circular cross-section) is defined by two opposite apertures (in this case semi-circular apertures) in respective side walls of the two distribution box parts 2a, 2b. Centre points of these passages 6 also located in the afore-mentioned virtual longitudinal plane that intersects opposite edges of the shells 2a, 2b (in this embodiment) when they are in an assembled, closed, condition (see FIG. 3). In the present example, the centre points of the passages 6 are arranged in-line with each other. It will be appreciated that the microduct receiving passages 6 can also have another mutual arrangement.

Also, as a non limiting example, a transversal width W2 (viewed in a front view) of the box 2 can be larger than a maximum duct diameter of the duct 1 that can be received. In the present example, a maximum box width W2 (i.e. the width of the second box section) can for example depend on a number of signal conductors 16 that is to be accommodated, in addition to the maximum duct diameter.

A height H of the box 2 (indicated with arrow H in FIG. 3, the height direction being orthogonal with respect to the box width and box length directions) can be larger than a diameter D of the duct 1 to be mounted to. In the present example, the box height can be smaller than three times said duct diameter D, for example smaller than two times said duct diameter D (see FIG. 3). In a further embodiment, the box height H can be about the same as the width W1 of the a first box section 2T (for example in the range of the width W1 +/−25% of that width W1). Thus, a relatively compact, flat distribution box 1 can be achieved, providing an efficient handling and assembly.

In the example, the afore-mentioned sealing means 3 are configured for hermetically sealing the closed distribution box 2 (after assembly with the primary and secondary ducts 1, 15), to prevent gas exchange between the distribution chamber 4 and the local environment of the distribution box 2.

Particularly, the sealing means 3 can be configured for sealing an external surface of the primary duct 1 to the distribution box 2. The sealing means 3 can be configured in various ways. For example, the sealing means can comprise one or more gaskets or inlays of a resilient sealing material 3, the resilient sealing material 3 being compressed between the two opposite box sections 2a, 2b, between the distribution box 2 and the external surface of the primary duct 1, and between the distribution box 2 and external surfaces of proximal sections of any microducts 15, after mounting, to hermetically seal the chamber 4 from a local environment of the distribution box 2. As a result of the sealing, spread of hazardous gasses (for example toxic gasses, smoke during a fire) via the system—provided by the distribution box- and/or draught can be prevented.

Figure 5:
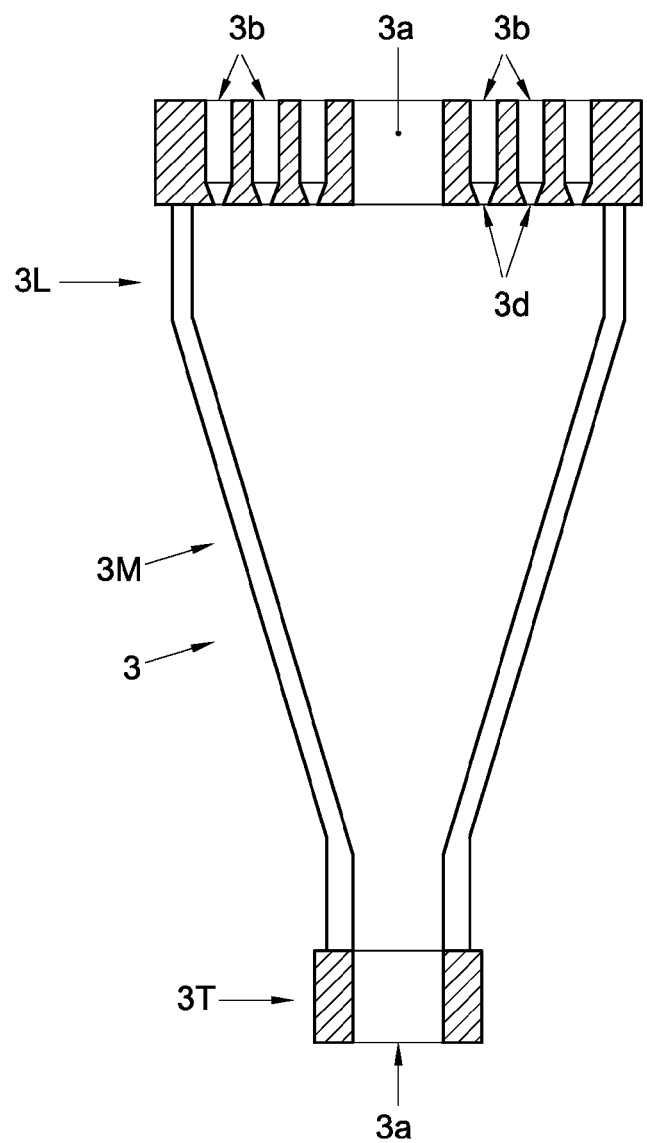
FIG. 5 a longitudinal cross-section of a resilient sealing material of the assembly of FIG. 1.

As follows from FIG. 5, the present sealing means 3 (such as a gasket or inlay) includes a first section 3T, that is received in the first distribution box section 2T after mounting (between the two box parts 2a, 2b), and an opposite second section 3L, which is received in the second distribution box section 3L between the two box parts 2a, 2b. The sealing means 3 includes an intermediate section 3M (received between the two box parts 2a, 2b at the intermediate box section 2M). After assembly, the first section 3T may be arranged vertically above the second section 3L, as in FIG. 1. Alternatively, after assembly, the first section 3T may be located vertically below the second section 3L.

The sealing means sections 3T, 3L, 3M are dimensioned to be compressed between the opposite box shells 2a, 2b at respective box sections 2T, 2L, 2M during the closing of the distribution box 2, to seal these sections 2T, 2L, 2M from the environment. Each of the opposite box shells 2a, 2b can be provided with a profile or structure for holding the respective sealing means in place (along or close to the edges of the main walls 3k of the shells 2a, 2b), each profile or structure for example including one or more sealing means receiving grooves, retaining rims, or the-like.

In the embodiment, the first section 3T of the sealing means 3 includes a first passage 3a, arranged in-line with (in the example concentrically) with the primary duct passages 5 of the shell parts 2a, 2b after assembly. A similar first passage 3a is provided in the second section 3L of the sealing means 3. The first passages 3b of the sealing means 3 are configured to match the external shape of the primary duct 1, preferably for seamlessly enclosing that duct 1 before assembly. Preferably, the first and second sealing means sections 3T, 3L are both configured to be pressed onto the duct 3a during the closing of the distribution box 2 (i.e. during assembly), to provide fluid-tight engagement therewith (and a respective fluid-tight closure of the distribution box).

Also, the second sealing means section 3L is provided with secondary passages 3b that arranged in-line with (in the embodiment concentrically) with the microduct receiving passages 6 of the shell parts 2a, 2b after assembly. The secondary passages 3b of the sealing means 3 are configured to match the external shapes of the microducts 15, preferably for seamlessly enclosing that duct 1 before assembly. Preferably, the second sealing means section 3L is dimensioned to be pressed onto microducts 15 extending into these passages 6 during the closing of the distribution box 2, to provide fluid-tight engagement therewith (and a respective fluid-tight closure of the distribution box).

The present embodiment includes a blocking structure for blocking axial passage of the proximal ends of the microducts 15. In the present example, the secondary passages 3b lead towards distal microduct stop surfaces of the sealing means 3, for blocking passage of proximal microduct edges. As follows from FIGS. 1, 5, in the embodiment, the present stop surfaces are conical. Through-holes 3d are in the stop surfaces, for passing signal conductors 16 from the chamber 4 to respective microducts 15.

Figure 6:
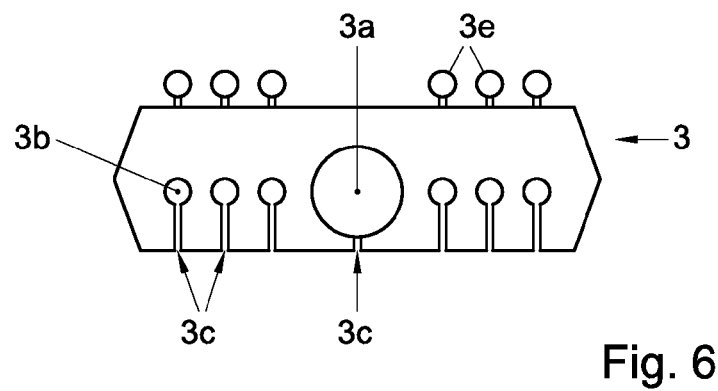
FIG. 6 a bottom view of the sealing material shown in FIG. 5, before installation.

Optionally, one or more of the duct passages 3a, 3b that are provided in the sealing means (for receiving respective duct sections) are provided with narrow lateral slits 3c, extending to an outer side of the sealing means 3 (see FIG. 6). Such slits 3c can enhance local compressibility of the sealing means 3, particularly for reducing cross-sections of respective passages 3a, 3b during the closing of the box 2. The slits 3c are closed after assembly, when the sealing means 3 is in the compressed condition between the box parts 2a, 2b.

Also, preferably, closing means 3e are available, for closing the secondary passages 3b that are not in use (i.e., which remain empty, and do not receive a microduct end). Such closing means can be configured in various ways. Preferably, the closing means can be removably applied, so that a passage 3b closed thereby can be made operational at a later stage. For example, suitable closing means can include a sealing tape, a covering, sealing kit, insertable plug 3e (as in the present example), or another suitable closing means. In the present example, the sealing means 3 as such can be provided with a set of (optionally resilient) closing plugs 3e. In the example, the sealing means 3 and closing plugs 3e are made in one piece, of the same material. The plugs 3e can be removed from a remainder of the sealing means 3 before assembly. Then, during assembly, selected secondary passages 3b can simply be hermetically closed using the readily available (matching) plugs 3e.

In one embodiment, a single sealing means 3 is provided, to be installed in the box 2 to achieve the sealing. In a further embodiment, the sealing means 3 is removable from the box 2, for example to be replaced.

Also, in a further embodiment, the sealing means can be composed of several sealing sections. For example, each of the box parts 2a, 2b can be provided with a respective section of the sealing means 3, the sections being removed from each other when the box 2 is in the opened condition.

Figure 4:
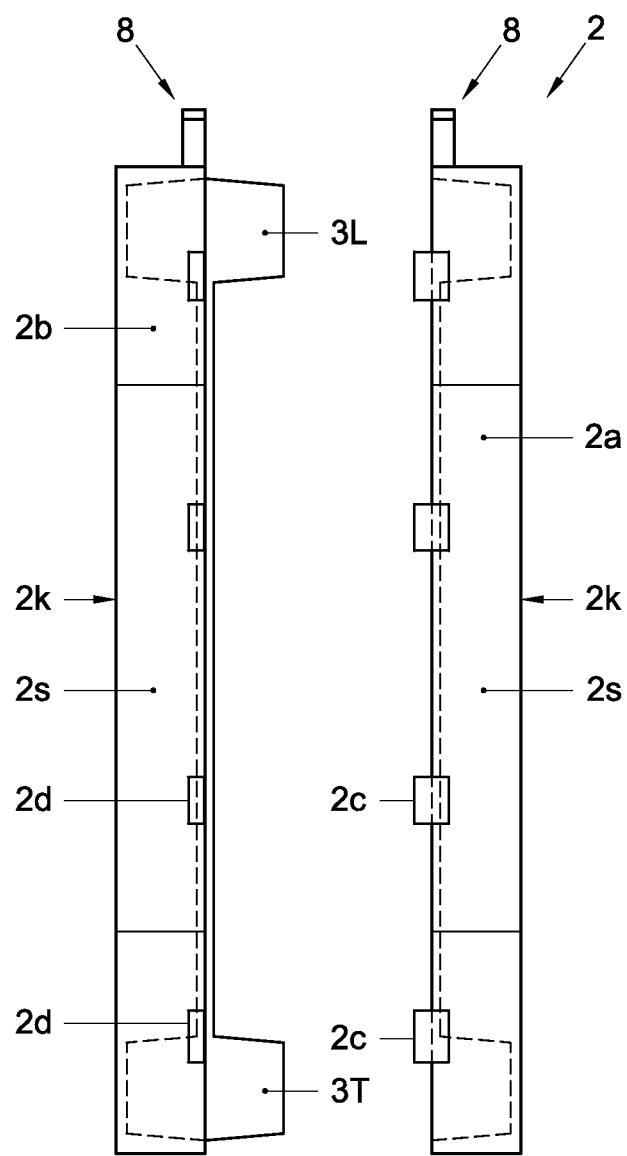
FIG. 4 a side view of the distribution box shown in FIG. 2, in a disassembled condition.

In the present example, connecting means 2c, 2d are provided, configured to connect the two box sections 2a, 2b to each other when the box 2 is mounted on the duct 1. The connecting means can be configured in various ways. Preferably, the connecting means are configure to provide a connection that can be manually undone in simple manner, with relatively little force. The connecting means can include one or more of: clicking connections, snapping means, threaded connectors, connecting pins, Velcro® connecting devices, one or more bendable or flexible connecting wires, or different connecting means. In the example, the shell parts 2a, 2b are provided with integral connecting means 2c, 2d (made in one piece there-with), particularly snap fingers 2c of one shell 2a arranged to releasingly hold the opposite shell 2b via respective snap grooves 3d (see FIG. 4) when the box 2 is in the closed condition. The connecting means 2c, 3d can be configured such that the box 2 retains its closed condition, counteracting spring forces of the compressed sealing means 3. Preferably, the box 2 is provided with a set of spaced-apart connecting means; in the example, each of the box sections 2T, 2M, 2L has respective connecting means 2c, 2d (and at opposite lateral side walls 2s).

Optionally, the two box parts 2a, 2b can be pivotally connected to each other (to be pivoted between an open and closed condition), using one or more suitable hinges, for example integral hinges (made in one piece with those parts).

Further, the assembly includes a dedicated mounting device 9, for example a clamping and/or locking device 9, for mounting (clamping and/or locking) the box 2 to the tube 1. To this aim, the box 2 is provided with a mounting section 8 for receiving the mounting device 9. In the example, the mounting section 8 is integral part (made in one piece with) the neck portion 3T of the box 2. Particularly, the mounting device is a flexible ty-rap clamping strip 9. Thus, a swift clamping (and in this case locking of the box 2) can be achieved, using inexpensive means.

For receiving the clamping strip 9, for example, the mounting section 8 can include a pair of opposite (in this case L-shaped) fingers 8 extending away from the chamber 4, from box side that includes an afore-mentioned duct passage 5. The width of each of the fingers 8 (in FIG. 1 measured normally with respect to the plane of the drawing) is preferably smaller that the external diameter D of the duct 1 to be held.

A relatively stable configuration is achieved in case the mounting device 9 connects both box parts 2a, 2b to each other. To this aim, in the example, each finger 8 is formed by two finger parts of opposite box parts 2a, 2b, joined together when the box is in the closed condition. As a result, also, the mounting device 9 acts as a locking device, for locking the box in the closed state.

Mounting of the distribution box 2 to a primary duct 1 can be at a point that is spaced-apart from duct ends (not shown). The mounting method preferably comprises positioning a duct section in the distribution box 2, when the box 2 is in the opened condition (i.e. when the two shells 2a, 2b are removed from each other, in an disassembled initial state). For example, during the mounting, the sealing means 3 can be installed on the duct 1, after which the shells 2a, 2b are mounted. Then, a distribution chamber 4, defined within the distribution box, can be hermetically sealed from the environment of the distribution box, by closing the box (i.e. by adjusting the box from the initial state to a sealing state, the adjustment of the distribution box 2 leading to the sealing of the distribution chamber 4). Herein, the resilient sealing means material is being compressed by the adjustment of the distribution box, the compressed resilient material providing the sealing of the distribution chamber, along edges of the shells 2a, 2b, and with the primary duct 1 at respective duct passages 5.

Moreover, assembly includes the coupling of one or more microducts 15 to the distribution box 2 at the respective ports 6, for receiving one or more signal conductors 16 from the distribution chamber 4. A seal is the provided between an outer surface of each secondary duct 15 and the distribution box 2, by the sealing means 3. Ports 6 that are not used are closed as well with above-mentioned closing means, for example plugs 3e. As a result, signal conductor distribution is achieved, via a hermetically closed system (at least, hermetically closed at the distribution location of the distribution box).

As a result, risk of transporting gasses (dangerous/flammable) from one floor in a multi dwelling unit to other floors in the building (via the hollow distribution duct 1) can be significantly reduced. Moreover, the mounting of the present distribution box 2 can be carried out swiftly, using only a few straightforward operator steps, utilizing clamping/locking of the box 2 to the primary duct 1 at only a single fixation point (using the mounting device 9).

As follows from the above, in an embodiment, a fully dividable box 2 is provided, for example consisting of two shells 2a, 2b with one or more sealing means (for example inlay's 3 of soft material) provided at primary duct entry openings 5, as well as at the microduct ports 6 and along (between) contact area of the two shells 2a, 2b. Also, the box 2 is constructed to be installed on a through passing primary duct 1. The sealing means 3 can ensure gastight entries for the various ducts 1, 15.

Figure 7:
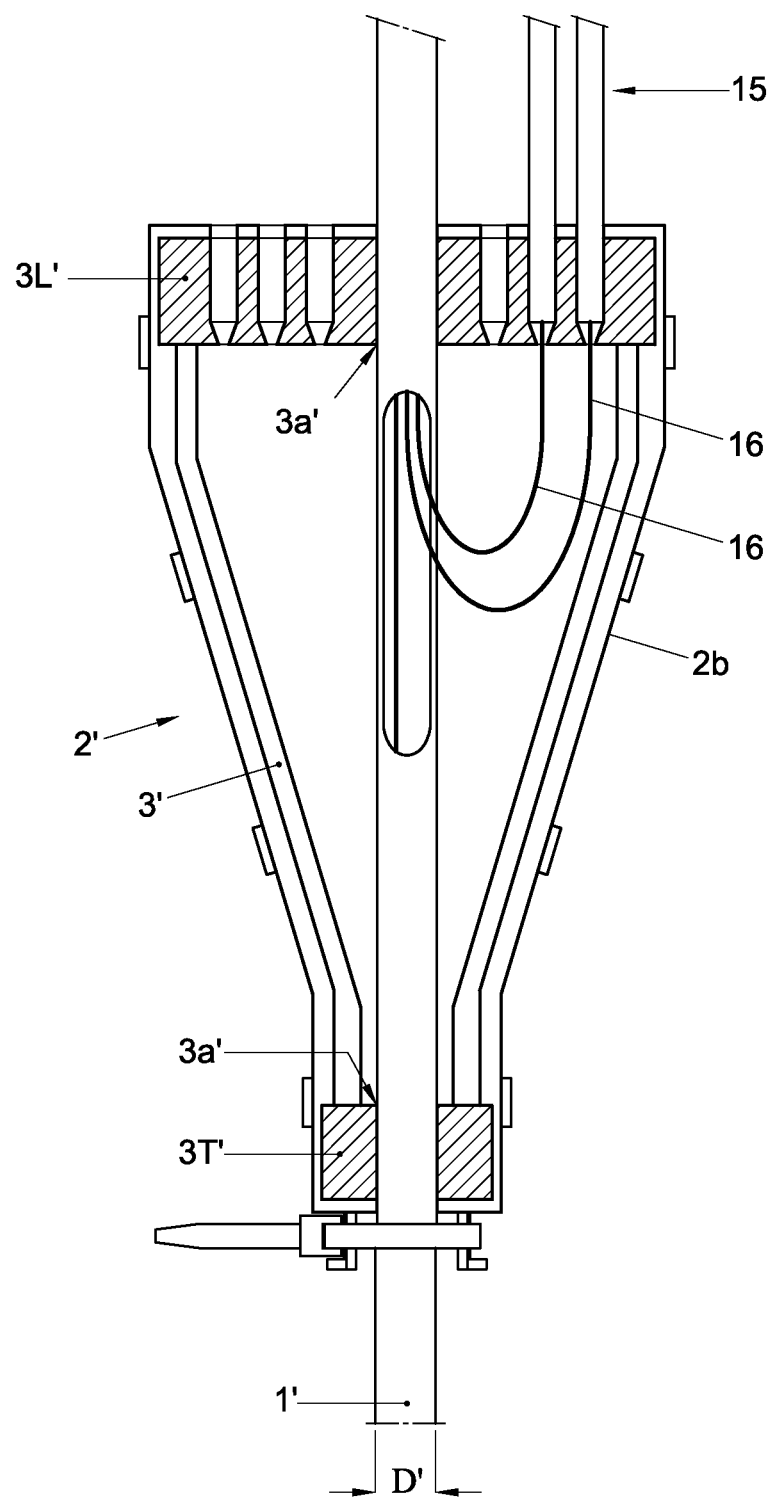
FIG. 7 a view similar to FIG. 1, with another primary duct.

In a further embodiment, following from FIG. 7, there can be provided a second duct 1' a different external diameter D' (in this case a smaller diameter D') than the diameter D of the duct 1 shown in FIG. 1. In that case the assembly comprises a first distribution box 2 that is configured to provide a fluid-tight engagement with the first duct 1, and a second distribution box 2' that is configured provide a fluid-tight engagement with the second duct 1'. In that case, preferably, at least some parts of the second distribution box 2' are the same as respective parts of the first distribution box 2. In the present example, the second distribution box 2' includes the two box parts, for example the shells 2a, 2b, of the first distribution box 2, as well as a respective second sealing means 3' that is adapted to provide a sealing engagement with the second duct 1' (at respective sealing sections 3T', 3L'). Particularly, the primary duct passages 3a' of the second sealing means 3' have a different cross-section than the primary duct passages 3a of the first sealing means 3, for receiving the second duct 1' with no or almost no mismatch.

Thus, for the primary duct 1, 1', a dedicated sealing means 3, 3' can be designed, enabling the distribution box 2 to be installed on a range of such ducts.

Similarly, in a further embodiment, secondary ducts 15 of different external diameters can be available. Then, also for such secondary ducts 15, dedicated sealing means 3 can be designed (having dedicated duct receiving ports 6), enabling the distribution box 2 to be installed on a range of such ducts 15.

Although the illustrative embodiments of the present invention have been described in greater detail with reference to the accompanying drawings, it will be understood that the invention is not limited to those embodiments. Various changes or modifications may be effected by one skilled in the art without departing from the scope or the spirit of the invention as defined in the claims.

It is to be understood that in the present application, the term "comprising" does not exclude other elements or steps. Also, each of the terms "a" and "an" does not exclude a plurality. Any reference sign(s) in the claims shall not be construed as limiting the scope of the claims For example, in the present examples, primary ducts 1, 1' having circular cross-sections have been discussed. Alternatively, a primary duct can have another external shape (when viewed in cross-section), for example oval, polygonal, square, rectangular, or differently.

Similarly, a secondary ducts (for example a microduct 15) is preferably provided with a circular external cross-section, however, that shape can also be oval, polygonal, square, rectangular, or a different shape.

What is claimed is:

1. An assembly comprising:
   at least one primary duct; and
   at least one distribution box having first and second opposed ends, the distribution box having a first primary duct passage at the first end of the distribution box and a second primary duct passage at the second end of the distribution box, the distribution box being mounted on the primary duct, in fluid-tight engagement there-with, for enclosing a distribution chamber therewith, the primary duct extending through the distribution box via the first and second primary duct passages,
   wherein the distribution box has secondary duct receiving passages at only one of said ends, the secondary duct receiving passages being configured for passing proximal end sections of secondary ducts therethrough towards the distribution chamber.

2. The assembly according to claim 1, wherein the distribution box comprises two box parts that engage the primary duct from two sides.

3. The assembly according to claim 2, wherein the two box parts comprise shells.

4. The assembly according to claim 2, further comprising connecting means configured to connect the two box parts to each other when the box is mounted on the primary duct.

5. The assembly according to claim 1, further comprising a dedicated clamping device for clamping the box to the primary duct.

6. The assembly according to claim 5, wherein the clamping device comprises a ty-rap clamper.

7. The assembly according to claim 1, further comprising a dedicated locking device for locking the box to the primary duct.

8. The assembly according to claim 1, wherein the distribution box comprises sealing means for sealing an external surface of the primary duct to the distribution box.

9. The assembly according to claim 1, further comprising a resilient sealing material, the resilient sealing material sealing the distribution chamber from an environment of the distribution box.

10. The assembly according to claim 1, wherein said at least one primary duct comprises a first primary duct and a second primary duct having mutually different external diameters, and wherein said at least one distribution box comprises a first distribution box that is configured to provide a fluid-tight engagement with the first primary duct, and a second distribution box that is configured provide a fluid-tight engagement with the second primary duct.

11. The assembly according to claim 1, wherein the distribution box includes a first section and an opposite second section, the first distribution box section being a relatively narrow neck portion and the second distribution box section being a relatively wide portion having a number of signal conductor passages.

12. The assembly according to claim 1, wherein the side of the distribution box that is provided with the secondary duct receiving passages is also provided with one of the primary duct passages.

13. The assembly according to claim 12, wherein the secondary duct receiving passages are symmetrically arranged with respect to the primary duct passage.

14. The assembly according to claim 2, wherein each secondary duct receiving passage is defined by two opposite apertures in respective side walls of the two distribution box parts.

15. The assembly according to claim 5, wherein the distribution box comprises two box parts that engage the primary duct from two sides, the dedicated clamping device is a mounting device for connecting both box parts to each other.

16. The assembly according to claim 7, wherein the distribution box comprises two box parts that engage the primary duct from two sides, the dedicated locking device is a mounting device for connecting both box parts to each other.

* * * * *